(12) United States Patent
McAllister et al.

(10) Patent No.: US 12,116,046 B2
(45) Date of Patent: Oct. 15, 2024

(54) VEHICLE FRONT BUMPER FASCIA ASSEMBLY FOR DIRECTING AIR AND WATER FLOW

(71) Applicant: Rivian IP Holdings, LLC, Irvine, CA (US)

(72) Inventors: Andrew McAllister, Newport Coast, CA (US); Zackery Patrick Borton, Howell, MI (US); Jonathan Szczupak, Orange, CA (US); Alexandra Anderson, Escondido, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 259 days.

(21) Appl. No.: 17/855,893

(22) Filed: Jul. 1, 2022

(65) Prior Publication Data

US 2024/0002002 A1    Jan. 4, 2024

(51) Int. Cl.
| | |
|---|---|
| *B62D 35/00* | (2006.01) |
| *B60R 19/18* | (2006.01) |
| *B62D 25/18* | (2006.01) |
| *B62D 35/02* | (2006.01) |
| *B62D 37/02* | (2006.01) |
| *F16D 65/78* | (2006.01) |

(52) U.S. Cl.
CPC ............ *B62D 35/005* (2013.01); *B60R 19/18* (2013.01); *B62D 25/18* (2013.01); *B62D 35/02* (2013.01); *B60R 2019/1886* (2013.01); *B62D 37/02* (2013.01); *F16D 65/78* (2013.01)

(58) Field of Classification Search
CPC ...... B62D 35/005; B62D 35/02; B62D 37/02; B62D 25/18; B62D 25/182; B60R 19/18; B60R 2019/1886
See application file for complete search history.

(56) References Cited

U.S. PATENT DOCUMENTS

| | | | | |
|---|---|---|---|---|
| 9,669,807 | B2 * | 6/2017 | Wolf | F16D 65/847 |
| 9,669,885 | B1 * | 6/2017 | Fahland | B62D 37/02 |
| 9,694,858 | B2 * | 7/2017 | Wolf | B62D 37/02 |
| 10,059,291 | B2 * | 8/2018 | Kishima | B62D 35/02 |
| 10,227,096 | B2 * | 3/2019 | Fujiu | B62D 35/02 |
| 10,384,731 | B2 * | 8/2019 | Kobayashi | B60G 7/00 |
| 11,084,544 | B2 * | 8/2021 | Nishida | B62D 25/16 |
| 11,230,328 | B2 * | 1/2022 | Parry-Williams | B62D 25/16 |
| 11,352,076 | B2 * | 6/2022 | Kay | B62D 35/005 |

(Continued)

*Primary Examiner* — Gregory A Blankenship
(74) *Attorney, Agent, or Firm* — Foley & Lardner LLP (57) ABSTRACT

Vehicular front bumper and fascia assemblies are provided. According to one implementation, a fascia is configured to cover a front bumper of a vehicle. The fascia includes fluid conduits configured to provide fluid flows to the front wheels and redirection portals that intersect the fluid conduits. The redirection portals provide fluid flows away from and/or around the front wheels. The fascia also includes adjustable panels associated with the fluid conduits. When the vehicle is travelling at a velocity below a predetermined lower level, the adjustable panels are configured to open the fluid conduits so as to provide the fluid flows toward the front wheels. When the vehicle is travelling at a velocity above a predetermined upper level, the adjustable panels are configured to close the fluid conduits and redirect the fluid flows through the redirection portals away from and/or around the front wheels.

17 Claims, 9 Drawing Sheets

(56) References Cited

U.S. PATENT DOCUMENTS

| | | | | |
|---|---|---|---|---|
| 11,807,311 B2* | 11/2023 | Harter | ............... | B62D 5/005 |
| 2012/0071075 A1* | 3/2012 | Wolf | ............... | B60T 5/00 |
| | | | | 454/162 |
| 2016/0016617 A1* | 1/2016 | Wolf | ............... | B60K 11/04 |
| | | | | 296/208 |
| 2016/0176385 A1* | 6/2016 | Wolf | ............... | F16D 65/847 |
| | | | | 296/208 |
| 2016/0176450 A1* | 6/2016 | Wolf | ............... | B62D 35/00 |
| | | | | 180/68.2 |
| 2016/0272258 A1* | 9/2016 | Gibson | ............... | B62D 37/02 |
| 2018/0264933 A1* | 9/2018 | Laurent | ............... | B62D 35/007 |
| 2024/0002002 A1* | 1/2024 | McAllister | ............... | B62D 25/18 |

* cited by examiner

VEHICLE FRONT BUMPER FASCIA ASSEMBLY FOR DIRECTING AIR AND WATER FLOW

INTRODUCTION

The present disclosure relates generally to automotive and other vehicles. More particularly, the present disclosure relates to the coverings and fascia components associated with the front structure and bumper of a vehicle having adjustable features for redirecting air and water (i.e., fluid) flow away from/around the front wheels of the vehicle to thereby reduce drag caused by such fluid flow impacting such front structure and bumper and front wheels. These adjustable features may also be used to selectively control the force of water impacting the coverings and fascia components and front wheels in a water fording situation.

SUMMARY

The present disclosure is directed to vehicles, front bumper assemblies, and front structures and fascia components configured to cover front bumpers of vehicles. In one implementation, a fascia assembly is configured to cover a front bumper of a vehicle and at least partially block a fluid flow path to the front wheels of a vehicle. The front fascia assembly may include one or more fluid conduits, where each fluid conduit is configured to provide a fluid flow path to a respective front wheel. The front fascia assembly also includes one or more redirection portals each intersecting the associated fluid conduit. Each redirection portal is configured to provide a fluid flow away from/around the associated front wheel. The front fascia assembly may include one or more adjustable panels, where each adjustable panel is associated with a respective fluid conduit. When the vehicle is travelling at a velocity below a predetermined lower level, for example, each adjustable panel is configured to substantially open the respective fluid conduit so as to provide the fluid flow to the respective front wheel. When the vehicle is travelling at a velocity above a predetermined upper level, each adjustable panel is configured to substantially close the respective fluid conduit and redirect the fluid flow through the associated redirection portal away from/around the associated front wheel. Selective reconfiguration can also be used in water fording applications, resulting in more or less water force applied to the front fascia components of the vehicle.

In some embodiments, when the adjustable panels are arranged in a closed configuration to substantially close the fluid conduits, the redirected air flow may serve to aerodynamically reduce drag on the vehicle at higher velocities. Each adjustable panel may include a hinge to allow the respective adjustable panel to pivot between an open position and a closed position. The front fascia assembly may further include actuators, such as stepper motors or the like, configured to deploy the adjustable panels between the open position and the closed position. For example, the stepper motors or the like may be configured to move the adjustable panels to the open position when the velocity of the vehicle drops below the predetermined lower level and move the adjustable panels to the closed position when the velocity of the vehicle exceeds the predetermined upper level. In some embodiments, the fascia may also include one or more sets of locking mechanisms, where each set of locking mechanisms may be configured to hold a respective adjustable panel in either the open position or closed position. The redirection portals may be configured to redirect the fluid flow in an outward direction and/or a downward direction relative to the longitudinal axis of the vehicle and the front fascia. The front fascia assembly may further include fluid/air curtains or the like arranged in the fluid conduits, where the fluid/air curtains may also be configured to control and direct fluid flow.

BRIEF DESCRIPTION OF THE DRAWINGS

The present disclosure is illustrated and described herein with reference to the various drawings. Like reference numbers are used to denote like assembly components/method steps, as appropriate. Unless otherwise noted, components depicted in the drawings are not necessarily drawn to scale.

DETAILED DESCRIPTION

The present disclosure relates to vehicles, front bumper and fascia assemblies for vehicles, and other systems and methods. Embodiments of the present disclosure are configured to provide a combination of a rugged front bumper fascia with an adjustable feature that can change the aerodynamics of the front bumper fascia to reduce drag. Further, embodiments of the present disclosure are configured to monitor the velocity of the vehicle, whereby, at lower speeds, the front tires and/or brakes can be more exposed to fluid flow and/or visibly exposed, and, at higher speeds, a movable panel can be repositioned to redirect fluid flow away from the front wheel, thereby reducing drag.

The embodiments of the present disclosure can actively adjust the movable panel to be open when the vehicle is stationary or operating at lower speeds while also adjust the movable panel to provide aerodynamic efficiency when the vehicle is travelling at higher speeds to reduce energy consumption (e.g., fuel for internal combustion engines, battery power for electric vehicles, or fuel and battery power for hybrid engines). The movable panel may be moved to a position that blocks the line-of-sight to the tires when the vehicle is moving and instead redirects fluid flow through auxiliary ducts or portals to reduce resistance. Reducing drag results in better aerodynamic efficiency, conserves energy (e.g., fuel, battery charge, etc.), and increases the range that the vehicle can travel. Also, redirected air can be put to use for air-cooling certain vehicle components and systems, such as the braking system. Furthermore, better aerodynamics can also lead to improved high-speed stability. Selective reconfiguration can also be used in water fording applications, resulting in more or less water force applied to the front fascia components of the vehicle.

Figure 1:
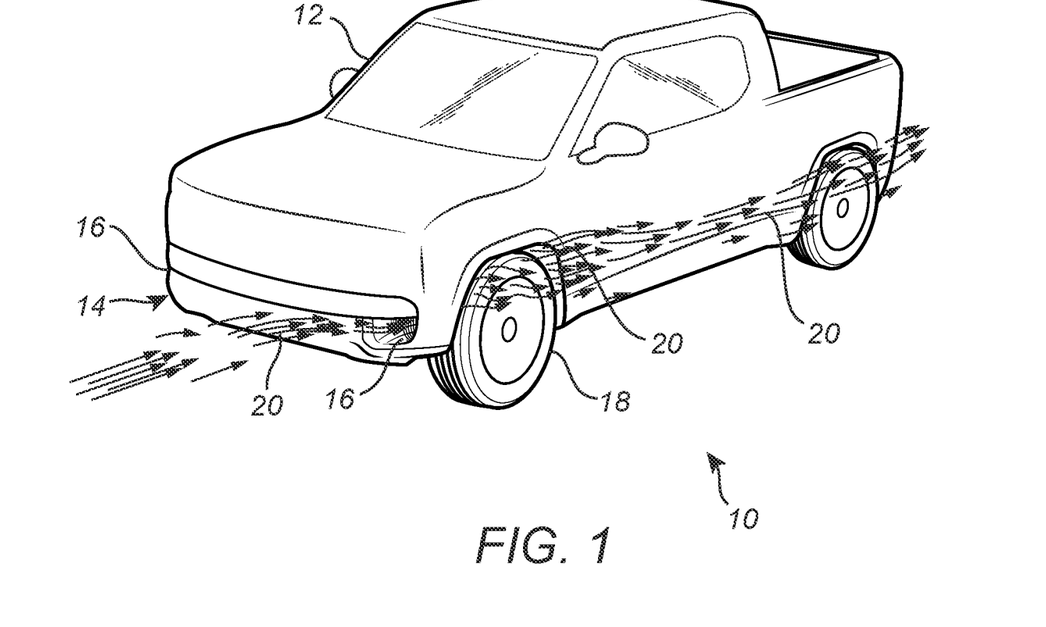
FIG. 1 is a display illustrating an air flow simulation based on an air flow analysis of a vehicle model having a specific front bumper fascia, according to various embodiments.

FIG. 1 is a display illustrating an air flow simulation 10 based on an air flow analysis of a vehicle model 12 having a specific front bumper fascia 14 that includes conduits 16 configured to provide fluid flow and/or a line-of-sight to each of the front wheels 18 from a facing perspective.

The lines shown in FIG. 1 represent air flow patterns 20 with respect to the vehicle model 12. It may be noted that the air flow analysis shows that when the vehicle 12 is travelling, the air, represented by the air flow patterns 20, will tend to enter through conduits 16 of the front bumper fascia 14 and run into the front wheels 18 (or tires).

Figure 2:
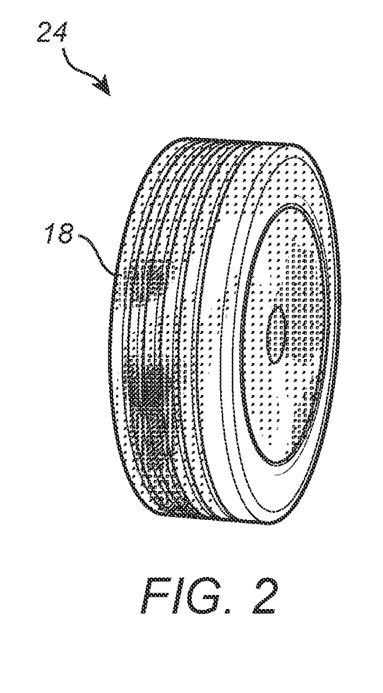
FIG. 2 is a display illustrating an air flow simulation of a front wheel of the vehicle shown in FIG. 1, according to various embodiments.

FIG. 2 is a display illustrating an air flow simulation 24 of the driver side front wheel 18 of the vehicle model 12 with the front bumper fascia 14 having the conduits 16 configured as shown in FIG. 1. Again, the front wheels 18 are shown to experience significant wind resistance at higher velocities, as depicted by the patterns.

Figure 3:
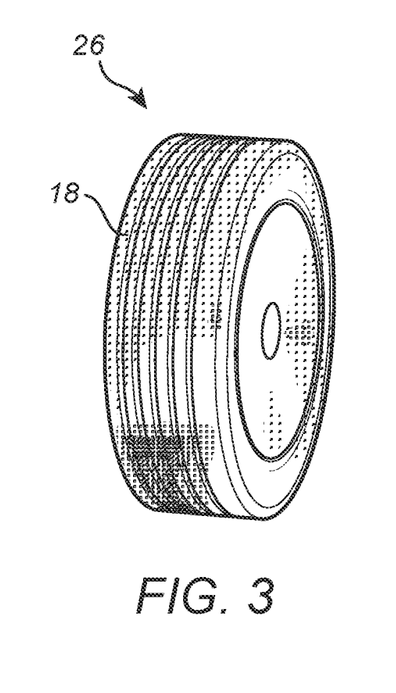
FIG. 3 is a display illustrating an air flow simulation based on an air flow analysis of a vehicle model having another front bumper fascia, according to various embodiments.

FIG. 3, on the other hand, is a display illustrating an air flow simulation 26 based on an air flow analysis of a vehicle model having a front bumper fascia configured differently from the front bumper fascia 14 shown in FIG. 1. Instead, a front bumper fascia with conduits configured to not provide fluid flow and/or a line-of-sight to each of the front wheels 18 from a facing perspective (or a front bumper fascia without conduits) is simulated in this example. As can be seen in this case, the patterns show less wind resistance on the front wheels.

In the embodiments described below, drag savings can be obtained using one or more auxiliary conduits, ducts, or portals to allow air (or other fluid) to exit the front bumper fascia in a direction that reduces the fluid resistance on the front wheels 18. For example, by moving the fluid exit outward (and/or downward in some embodiments), the fluid can better flow around the front wheels 18.

Figure 4:
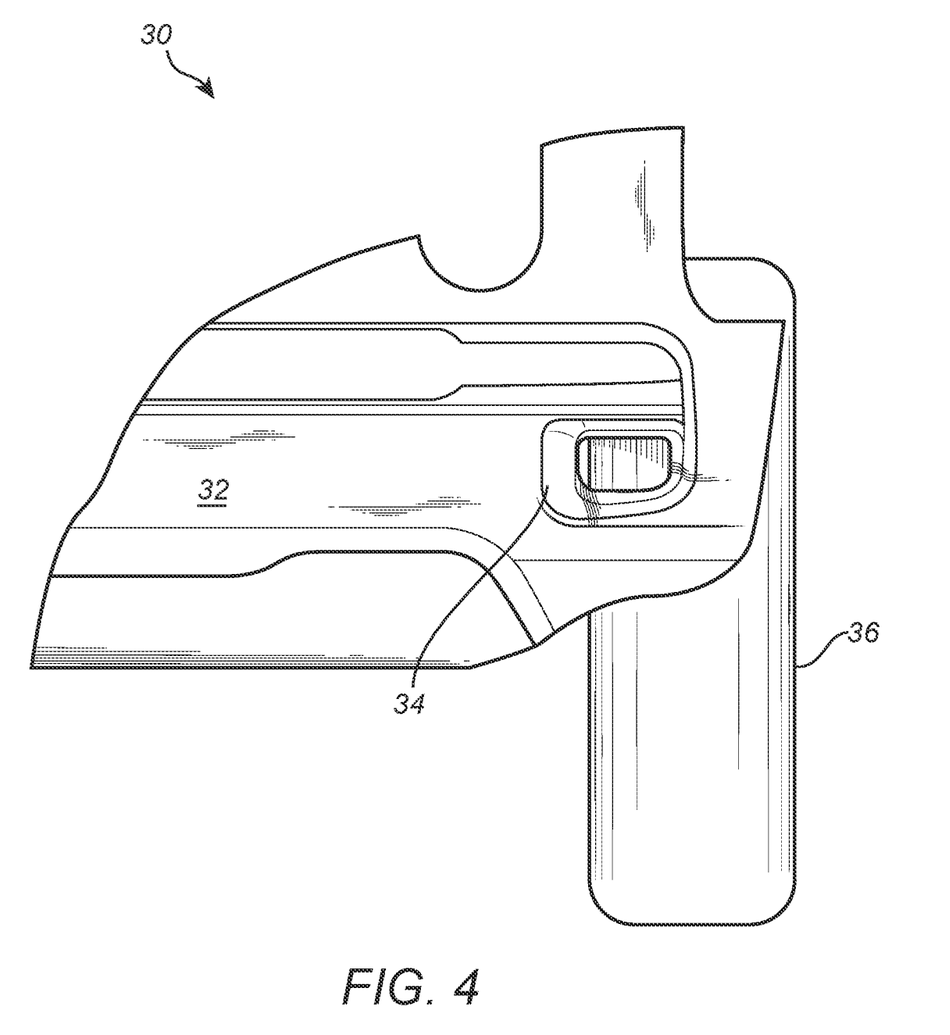
FIG. 4 is a diagram illustrating a partial front view of a vehicle having the front bumper fascia shown in FIG. 1 and having an adjustable panel of the front bumper fascia in a first, open configuration, according to various embodiments.

FIG. 4 is a diagram illustrating a partial front view of an embodiment of a vehicle 30 having a front bumper fascia 32, which may be the same as or similar to the model of the front bumper fascia 14 shown in FIG. 1. In particular, FIG. 1 shows the front, driver-side corner of the vehicle 30 and front bumper fascia 32. The front bumper fascia 32 as shown includes a pair of conduits, where only the driver-side conduit 34 is shown in FIG. 4. It should be understood that the front bumper fascia 32 may have substantial side-to-side symmetry, whereby a passenger-side conduit (not shown) may have the same or similar (yet reversed) features as the driver-side conduit 34. Thus, it may also be noted that description of the driver-side conduit 34 shown and described throughout the present disclosure also applies to the passenger-side conduit as well.

The conduits 34 give the front bumper fascia 32 a more rugged look by allowing a person, looking at the vehicle 30 from a facing perspective (as shown in FIG. 4), to see an upper portion of the front tires or wheels 36, providing a front view to reveal a view of the front wheel 36. Again, the wheel 36 shown in FIG. 4 is the driver-side wheel (or tire) and a similar/same wheel on the passenger side will also be present and can be viewed through the corresponding conduit from the facing perspective.

Furthermore, the front bumper fascia 32 includes an adjustable panel (not shown in FIG. 4). In FIG. 4, this adjustable panel may be in an "open" position to allow the view of the upper portion of the tire. The open position may refer to the positioning of the adjustable panel, but may also refer to the condition or state of the conduit 34 being "opened" to enable the line-of-sight of the wheel 36. As illustrated in FIG. 4, the adjustable panel may be in a stowed position and out of view.

Figure 5:
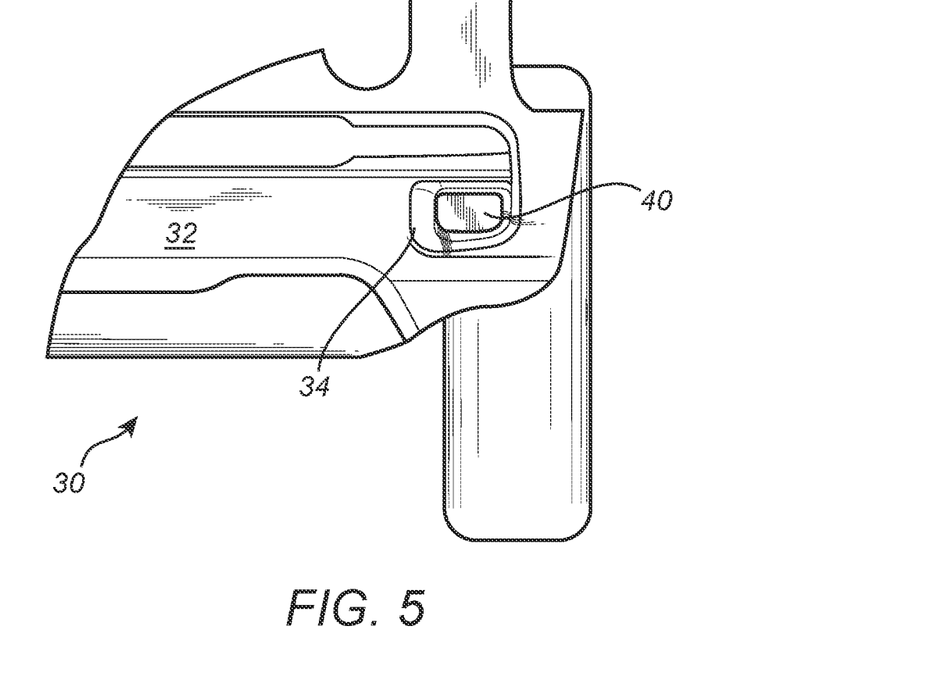
FIG. 5 is a diagram illustrating a partial front view of the vehicle of FIG. 4, where the adjustable panel of the front bumper fascia is in a second, closed configuration, according to various embodiments.

FIG. 5 is a diagram illustrating a partial front view of the vehicle 30 of FIG. 4 where the adjustable panel 40 of the front bumper fascia 32 is shown. In particular, the adjustable panel 40 is configured in a "closed" position, which closes the conduit 34, thereby blocking the view of the wheel 36 and redirecting fluid flow through an alternative path, as described in more detail below. For example, this alternative path may be a redirected portal directed away from the front wheel 36 to allow for more aerodynamic efficiency with less drag.

Figure 6:
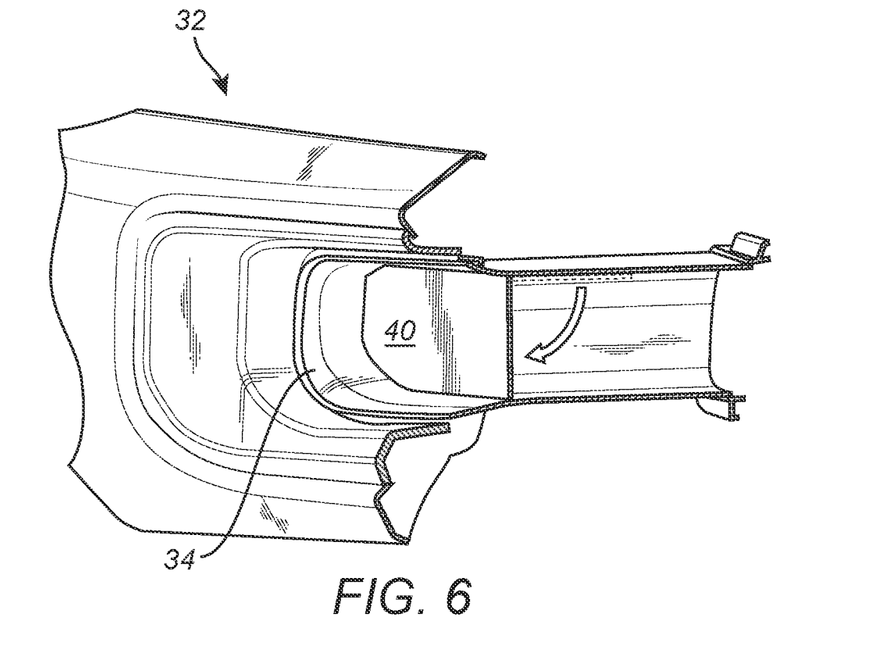
FIG. 6 is a diagram illustrating a partially cut-away view of the front bumper fascia shown in FIGS. 4 and 5, where the adjustable panel is in the closed position, according to various embodiments.

FIG. 6 is a diagram illustrating a partially cut-away view of the front bumper fascia 32 shown in FIGS. 4 and 5 from a perspective that shows the front, driver-side corner of the vehicle 30. The adjustable panel 40, as shown in FIG. 6, is in the closed position. The drag reduction system of the present disclosure may include the conduit 34 through the front bumper fascia 32 with the adjustable panel 40 configured in either an open or closed position to offer a primary flow path when the vehicle 30 is stationary or moving at lower speeds (e.g., less than 45 mph) and a diverted flow path when the vehicle 30 is travelling at higher speeds (e.g., greater than 45 mph).

Figure 7:
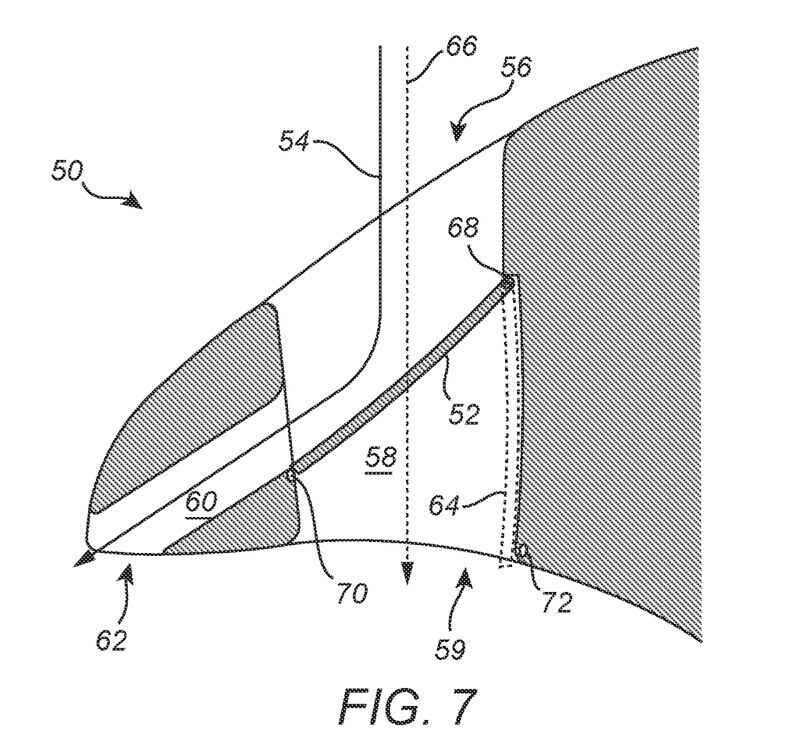
FIG. 7 is a diagram illustrating a cross-sectional top view of a portion of the front bumper fascia with the adjustable panel in the closed position, according to various embodiments.

FIG. 7 is a diagram illustrating a cross-sectional top view of an embodiment of a driver-side portion of a front bumper fascia 50, which may be the same as or similar to the front bumper fascia 32 described with respect to FIGS. 4-6. The front bumper fascia 50 may include an adjustable panel 52, which may be the same as or similar to the adjustable panel 40 described with respect to FIGS. 4-6. As illustrated, the adjustable panel 52 is shown in a closed position. When the vehicle (e.g., vehicle 30) is travelling above a predetermined threshold (e.g., about 45 mph) and when the adjustable panel 52 has been moved to the closed position, a fluid flow pattern 54 may be directed through a front portion 56 of a conduit 58. The fluid flow pattern 54 is redirected through a redirection portal 60 and out through an alternate exit 62, thereby bypassing a rear portion 59 of the conduit 58. However, when the vehicle is travelling below the predetermined threshold, the adjustable panel 52 may be moved to a stowed location 64 to place the front bumper fascia 50 in an open position. In the open position, the adjustable panel 52 allows a fluid flow pattern 66 directly through the conduit, from the front portion 56 to the rear portion 59.

In some embodiments, the adjustable panel 52 may be flat or planar. In other embodiments, as shown in FIG. 7, the adjustable panel 52 may have a slightly curved shape, which may help aerodynamically at higher speeds. The adjustable panel 52 may be able to pivot between the open position and closed position using a hinge 68. The hinge 68 may be associated with a stepper motor or other suitable mechanism for moving the adjustable panel 52 to the opened or closed positions. Also, in some embodiments, the front bumper fascia 50 may include a first locking mechanism 70 for holding the adjustable panel 52 in the closed position and may further include a second locking mechanism 72 for holding the adjustable panel 52 in the open position. The locking mechanisms 70, 72 may simply be magnets that provide an attractive force to corresponding a magnetic end of the adjustable panel. In other embodiments, the locking mechanisms 70, 72 may include latches, temporary connection features, etc., for mechanically locking the adjustable panel 52 temporarily in either position.

Figure 8:
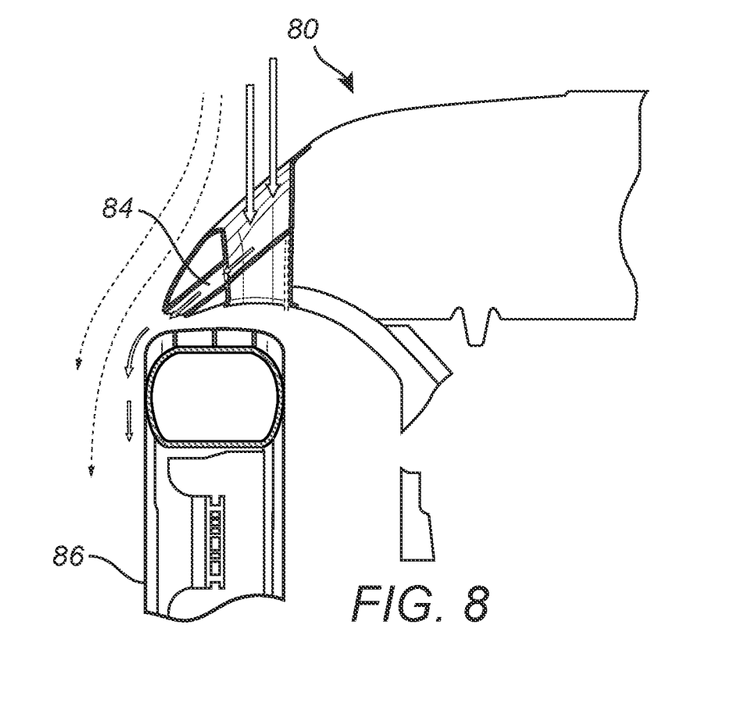
FIG. 8 is a schematic diagram illustrating a cross-sectional top view of the vehicle of FIGS. 4 and 5, where the adjustable panel of the front bumper fascia is in the closed position, according to various embodiments.

FIG. 8 is a schematic diagram illustrating a partial cross-sectional top view of an embodiment of a front bumper fascia 80 of a vehicle, where the front bumper fascia 80 may be the same as or similar to the front bumper fascia 32 shown in FIGS. 4 and 5 and/or the front bumper fascia 50 of FIG. 7. The front bumper fascia 80 includes an adjustable panel 82. In the closed position, as shown in FIG. 8, the adjustable panel 82 is configured to redirect flow through a redirection portal 84. The flow patterns are shown to substantially bypass the front wheel 86 to reduce drag during higher speeds.

Figure 9:
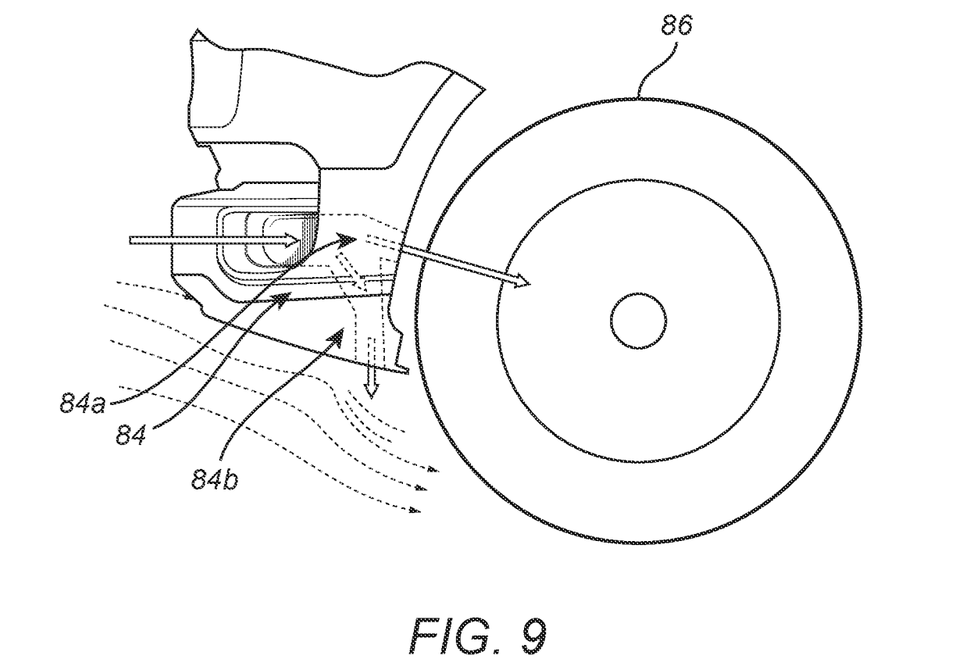
FIG. 9 is a diagram illustrating a side view of the front bumper fascia with fluid flow patterns (lateral and/or vertical) when the adjustable panels are in the closed position, according to various embodiments.

FIG. 9 is a diagram illustrating a side view of the front bumper fascia 80 of FIG. 8. As shown in this embodiments, when the adjustable panel (not shown) is arranged in the closed position to redirect flow, the redirection portal 84 may be configured to move the flow, as shown with respect to the arrows represent the flow patterns, in a lateral and/or downward direction, away from/around the front wheel 86. The lateral and downward directed flows may intersect with the flow patterns created by an external surface of the front bumper fascia 80 to reduce the resistance that would normally interact with the front wheel 86. In this embodiment, the redirection portal 84 may include a lateral redirection portal 84a generally configured to divert the flow outward and around the front wheel 86. This lateral redirection portal 84a may also provide a degree of downward or upward flow diversion. The redirection portal 84 may also or alternatively include a vertical redirection portal 84b generally configured to divert the flow downward and around the front wheel 86. This vertical redirection portal 84b may also provide a degree of outward flow diversion. Thus, the redirection portal 84 may provide and desired redirection channel(s) away from/around the front wheel 86 when the adjustable panel is arranged in the closed position to redirect flow.

From the embodiments described with respect to FIGS. 8 and 9, it may be noted that the redirection portal 84 may divert air/water in an outward (or outbound) direction (towards the side of the vehicle) and/or in a downward direction. Thus, the redirection portal 84 may act as invisible tire deflectors for deflecting air/water away from the tires.

Figure 10:
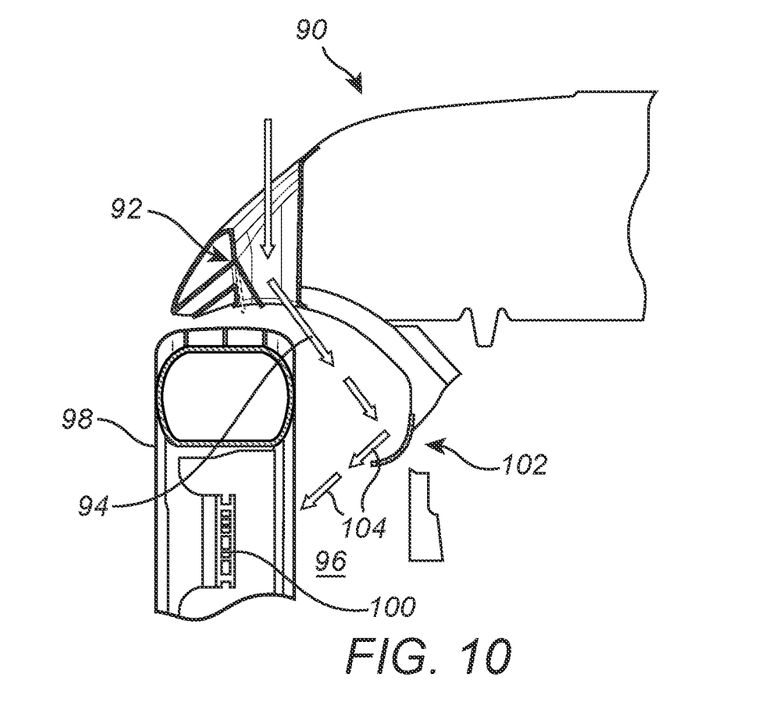
FIG. 10 is a schematic diagram illustrating a cross-sectional top view of a portion of the front bumper fascia with a set of deflecting panels configured for deflecting air towards front brake components of the vehicle, according to various embodiments.

FIG. 10 is a schematic diagram illustrating a cross-sectional top view of a portion of an embodiment of a front bumper fascia 90, which may be the same as or similar to the front bumper fascia 32, 50, 80 described above. In this embodiment, the front bumper fascia 90 may include a set of deflecting panels configured for deflecting air toward front brake components of the vehicle. For example, the front bumper fascia 90 may include a first panel 92 configured to move air in an inward manner, as indicated by arrows 94. The first panel 92 may also be adjustable type of panel with a hinge and controllable positioning. When moved to a deflecting position (as shown), the first panel 92 forces the air to flow inwardly within the interior portion of a wheel well 96, defined by a well guard, inner fender, wheel well liner, etc., which is configured to surround at least a portion of a respective wheel 98. The wheel 98, or wheel assembly, may include a rim, tire, braking system 100, among other components.

Furthermore, the front bumper fascia 90 (and/or portions of a well guard defines the wheel well 96) may also include a second panel 102. This second panel 102 may be straight, curved, or include any suitable shape and may be stationary or, according to other embodiments, may also be adjustable or movable between different positions. The second panel 102 is configured to further divert the air flow, as indicated by arrows 104 toward the braking system 100. The system front bumper fascia 90 and well guard may therefore be configured as a brake cooling system. For example, a control system of the vehicle may be configured to control the positioning of the first panel 92 and/or second panel 102 to direct air to the braking system 100 as needed. Depending on the immediate requirements of the braking system 100, additional air could be supplied to help keep it cool, particularly when it is under extreme stress. For instance, when the vehicle is carrying a heavy load or towing a heavy trailer and the vehicle is travelling down a hill, extra air cooling may be helpful. Also, if the vehicle is an electric vehicle and has a fully charged battery that does not need to be regenerated by the electric motor as is normally done in a "braking" condition, the braking system 100 may need to work harder than usual and may benefit from the air cooling effect.

Figure 11A:
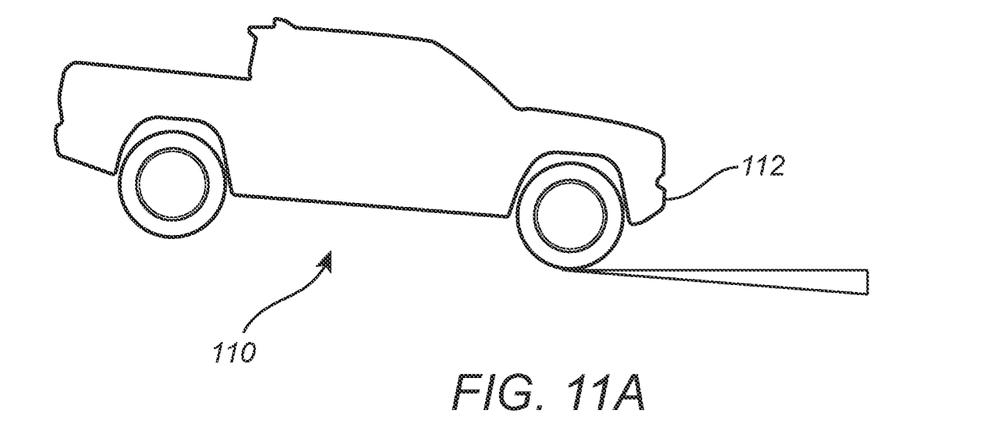
FIGS. 11A and 11B are diagrams illustrating different views of the vehicle for demonstrating fastening features of the front bumper fascia with respect to operating the vehicle in off-road water-wading scenarios, according to various embodiments.
Figure 11B:
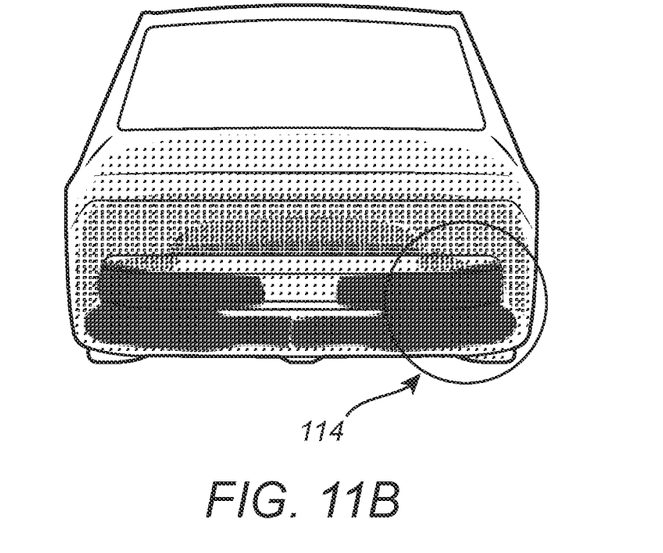

FIGS. 11A and 11B are diagrams illustrating different views of an embodiment of a vehicle 110 having a front bumper fascia 112 with fluid conduits 114 for providing a sightline to the front wheels. Again, the front bumper fascia 112 may be the same as or similar to the front bumper fascia 32, 50, 80, 90 described above. As illustrated in FIGS. 11A and 11B, the front bumper fascia 112 may include fastening features that allow the vehicle 110 to operate in off-road and/or water-wading scenarios. In a water wading or fording situation, the front bumper fascia 112 may include load limiting, whereby, when travelling through water or mud, the force that the front bumper fascia 112 experiences may be significant. However, the front bumper fascia 112 may include mechanisms to reduce this force. For example, the mechanical fastening of the front bumper fascia 112 may be reduced, thereby saving mass and cost. Furthermore, the reduced mechanical fastening may reduce the likelihood that the front bumper fascia 112 may break under these heavy forces. Further, the adjustable features of the present disclosure may be used to selectively control the force of water impacting the coverings and fascia components and front wheels in the water fording situation. When the fluid flow comprises water, for example, the adjustable panel may be disposed in the open configuration when a water flow above a predetermined threshold is sensed in the fluid conduit, using an appropriate water sensor disposed within or near the conduit, so as to direct the fluid flow to the front wheel and the adjustable panel may be disposed in the closed configuration when a water flow below a predetermined threshold is sensed in the fluid conduit so as to direct the fluid flow away from or around front wheel.

Figure 12:
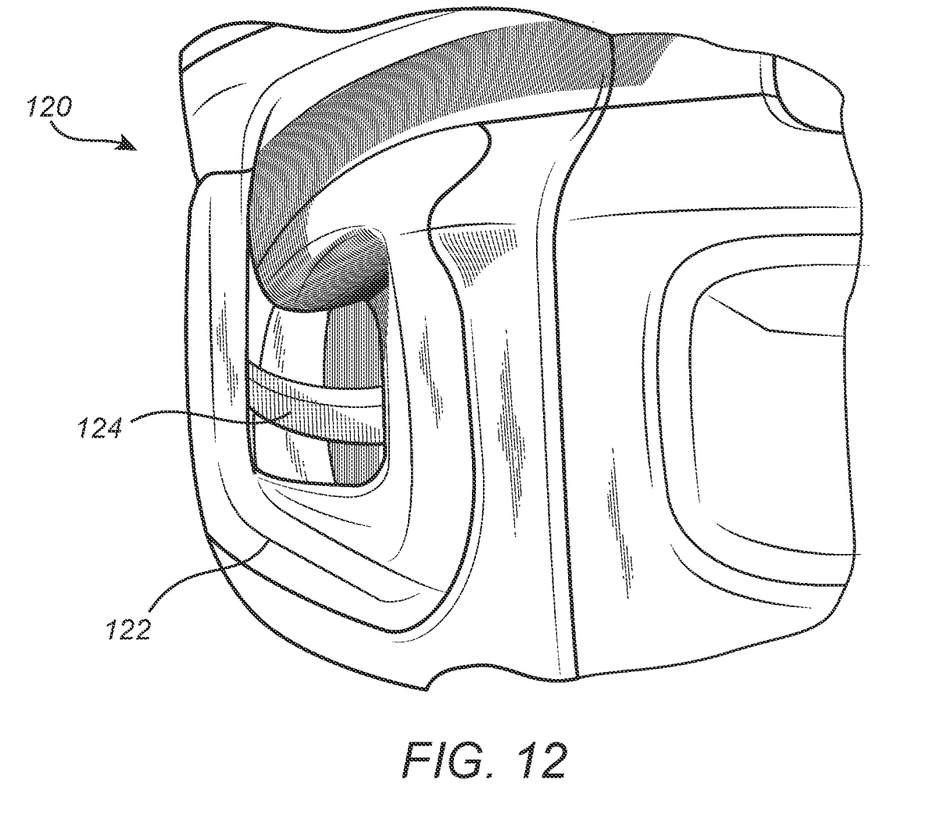
FIG. 12 is a perspective view of a model showing a front portion of the vehicle, where the front bumper fascia includes a dive plane, according to various embodiments.

FIG. 12 is a perspective view of a front portion 120 of the vehicle. In this example, the vehicle includes a front bumper fascia 122, which may be the same as or similar to the front bumper fascia 32, 50, 80, 90, 112 described above. As illustrated, the front bumper fascia 122 may include dive planes 124, which each may have similar features as the adjustable panels 40, 52, 82, 92, 102 described above, particularly with respect to the ability to redirect air flow as needed during higher speed operation. The dive plane 124 may be configured to be movable between a stowed, out-of-the-way, open position to allow a sightline to the tires and an air redirecting, closed position to provide better aerodynamics during the times when the vehicle is travelling at speeds greater than a certain upper threshold level.

Figure 13:
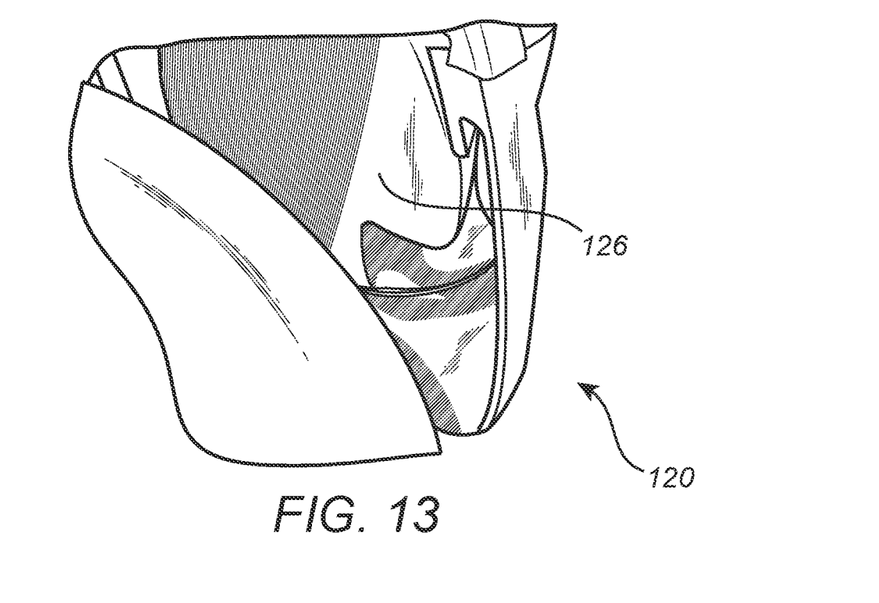
FIG. 13 is another perspective view of the model of the vehicle of FIG. 12, where the front bumper fascia includes an air curtain, according to various embodiments.

FIG. 13 is another perspective view of the front portion 120 of the vehicle of FIG. 12. As shown in this embodiment, the front bumper fascia 122 further includes air curtains 126, each of which may have similar characteristics as the walls of the conduits 34, 58 and/or redirection portals 60 84 described above. The air curtain 126 can be used for separating the main front-to-back fluid conduit from the side-diverted redirection portal. Using the dive plane 124 and air curtain 126, along with the main conduit, can provide aerodynamic benefits for reducing drag.

Also, the air curtains 126 may be configured as active components and may be configured to reduce the air flow wake at the front wheels. In higher speed operation, the air curtain 126 is configured to divert air flow such that air can be redirected around the front wheels to reduce drag.

Figure 14:
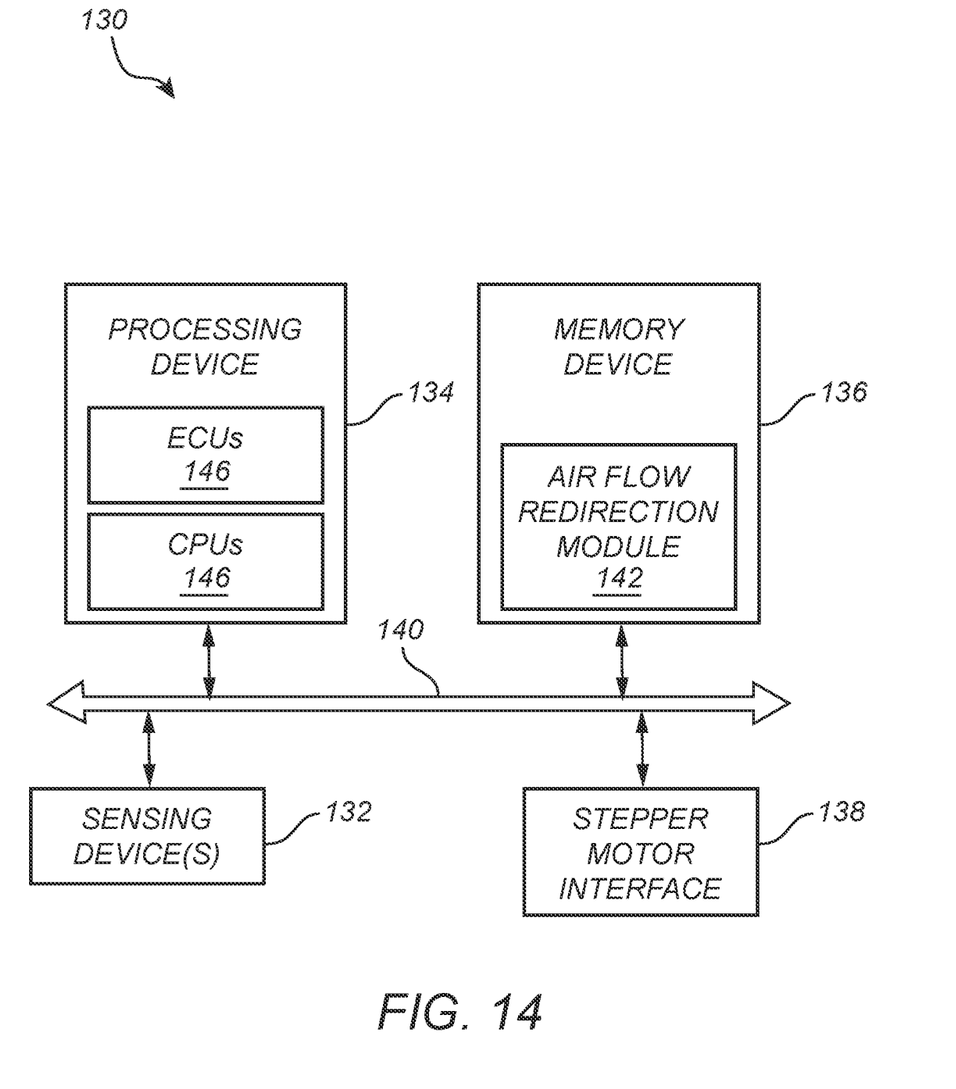
FIG. 14 is a block diagram illustrating a control device of the vehicle for adjusting the adjustable panels in order to reduce drag on the vehicle when the vehicle is travelling at higher velocities, according to various embodiments.

FIG. 14 is a block diagram illustrating an embodiment of a control device 130 of a vehicle for redirecting air flow as needed. In this embodiment, the control device 130 includes one or more sensing devices 132, a processing device 134, a memory device 136, and a stepper motor interface 138, each interconnected with each other via an interface 140 (e.g., vehicle communication bus). The memory device 136 may include an air flow redirection module 142, which may be configured in software and/or firmware and may enable the processing device 134 to perform certain functionality to control adjustable panels (e.g., adjustable panels 40, 52, 82, 92, 102, dive planes 124, etc.) to move the adjustable panels to either a closed or open position, as described above. By closing conduits (e.g., placing the adjustable panels in the closed position), the control device 130 is configured to redirect air flow in order to reduce drag on the vehicle. In some embodiments, the processing device 134 may include one or more Electronic Control Units (ECUs) 144 and/or one or more Central Processing Units (CPUs) 146.

The sensing devices 132 may include a velocity sensor for detecting the velocity of the vehicle. When the sensing devices 132 detect that the velocity is greater than a certain level, the air flow redirection module 142 may be configured to cause the processing device 134 to instruct the stepper motor interface 138 to provide signals to the appropriate stepper motors (e.g., associated with appropriate hinges 68) to cause the stepper motors to pivot or rotate the associated adjustable panels to the closed position. Then, when the sensing devices 132 detect that the velocity falls below the level (or falls below a lower threshold), then the air flow redirection module 142 may be configured to cause the processing device 134 to instruct the stepper motor interface 138 to provide signals to the appropriate stepper motors to cause the stepper motors to pivot or rotate the associated adjustable panels to the open position.

In some implementations, the control device 130 may be configured to adjust the adjustable panels in specific ways in order to reduce drag on the vehicle when the vehicle is travelling at higher velocities. In addition, the control device 130 may also be configured to adjust the adjustable panels in specific ways in order to redirect air flow to air-cool certain vehicle components that may tend to overheat during certain operating conditions. For example, the air-cooling functionality may be used for cooling a braking system (e.g., braking system 100) depending on the immediate requirements of the braking system. As such, additional air could be supplied to help cool these systems under certain load conditions, such as when towing a large trailer down a hill with a full battery.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Figure 15:
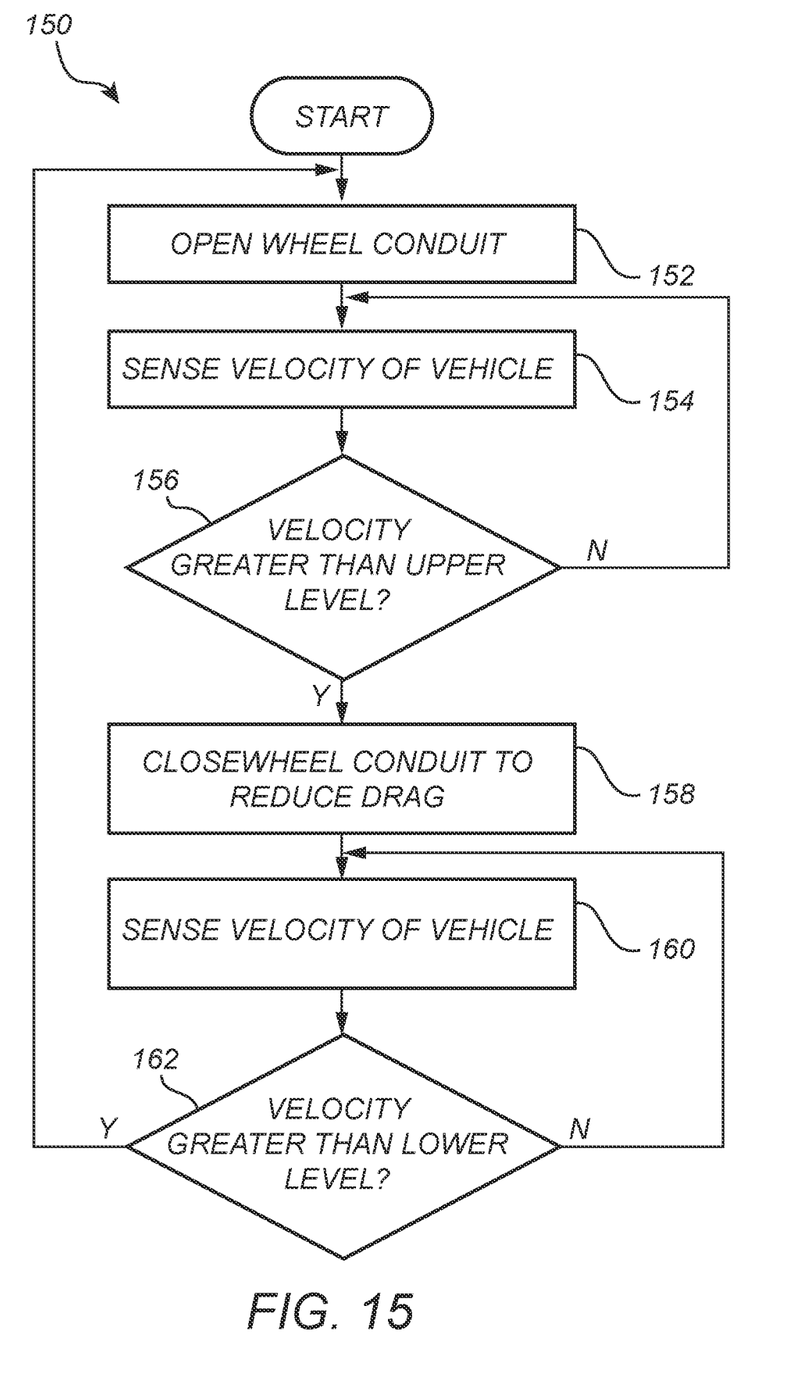
FIG. 15 is a flow diagram illustrating a process of a state machine for controlling the position of the adjustable panels based on the velocity of the vehicle, according to various embodiments.

FIG. 15 is a flow diagram illustrating an embodiment of a process 150. The process 150 may represent the operations of a state machine (e.g., associated with the processing device 134) and/or may represent functionality of the air flow redirection module 142. In particular, the process 150 may be configured for controlling the position of adjustable panels based on the velocity of the vehicle.

The process 150 includes a step of opening a wheel conduit for aesthetic purposes, as indicated in block 152. The wheel conduit may include any suitable configuration of a conduit, such as the conduits 34, 58 described above. The opening of the wheel conduit may be an initial step when the vehicle is in park and is first started. The process 150 also includes sensing the velocity of the vehicle, as indicated in block 154. Then, as indicated in decision diamond 156, the process 150 includes determining if the sensed velocity is greater than an upper level (e.g., greater than 45 mph). If not, the process 150 returns back to block 154 and continues sensing the velocity (e.g., every two or three seconds) until it is determined that it exceed this upper level.

When it is determined that the velocity is greater than the upper level, the process 150 goes to block 158, which includes the step of closing the wheel conduit to reduce drag. Then, the process 150 includes sensing the velocity of the vehicle again, as indicated in block 160. Also, the process 150 includes determining if the sensed velocity is less than a lower level (e.g., less than 35 mph), as indicated in decision diamond 162. If not, the process 150 returns to block 160 and continues to check the velocity (e.g., every two or three seconds) until it is determined that the velocity falls below the lower level. Once it is determined that the velocity is less than the lower level, the process 150 returns to block 152 and opens the wheel conduit again (for aesthetic purposes). It may be noted that the upper level and the lower level may be same. However, in order to avoid the scenario where the vehicle is travelling at about this level and wheel conduit is opened and closed repeatedly, it may be beneficial to set the upper and lower levels where there is a range where there is no switching from one position to another.

Therefore, according to the various embodiments of the present disclosure, a vehicle may be provided having at least a front bumper and front wheels. For example, the vehicle may include a face component (e.g., fascia) attached to and covering the front bumper. The face component may be configured to at least partially block a front view of the front wheels. The vehicle may further include fluid conduits formed in the face component, where each fluid conduit may be configured to provide a sightline to a respective front wheel. The vehicle may also include redirection portals formed in the face component, where each redirection portal may be configured to intersect a respective fluid conduit and may be configured to provide an air flow away from a respective front wheel. Also, the vehicle may include adjustable panels arranged in the fluid conduits of the face component, where each adjustable panel may be associated with a respective fluid conduit. When the vehicle is travelling at a velocity below a predetermined lower level, each adjustable panel may be configured to substantially open the respective fluid conduit so as to provide the sightline to the respective front wheel. When the vehicle is travelling at a velocity above a predetermined upper level, each adjustable panel may be configured to substantially close the respective fluid conduit and redirect the air flow through a respective redirection portal away from the respective front wheel.

In some embodiments, the redirection portals may be configured to redirect the air flow in an outward direction and/or a downward direction. The face component or fascia may further include air curtains arranged in the fluid conduits, where the air curtains may be configured to control air flow. Furthermore, when the adjustable panels are arranged in a closed position to substantially close the fluid conduits, the redirected air flow may be configured to aerodynamically reduce drag on the vehicle at higher velocities. Each adjustable panel may include a hinge to allow the respective adjustable panel to pivot between an open position and a closed position. The vehicle may further comprise a control device and stepper motors. For example, the control device may be configured to monitor the velocity of the vehicle and then cause the stepper motors to pivot the adjustable panels to the open position when the velocity is below the predetermined lower level. Upon monitoring the velocity, the control device may also cause the stepper motors to pivot the adjustable panels to the closed position when the velocity is above the predetermined upper level. In some embodiments, the vehicle or fascia may include sets of locking mechanisms, where each set of locking mechanisms may be configured to hold a respective adjustable panel in either the open position or closed position.

According to some embodiments, the predetermined lower level may be about 35 mph and the predetermined upper level may be about 45 mph. Also, the vehicle may further include a) sets of front brake components associated with the front wheels, b) wheel wells at least partially surrounding top portions of the front wheels and the front brake components, c) air deflectors arranged in the fluid conduits of the face component (each air deflector configured to deflect an air flow to an inward space of the respective wheel well), and d) diverting elements arranged in the wheel wells (each diverting element configured to divert an air flow toward a respective set of front brake components).

Also, the embodiments of the present disclosure may be directed to a fascia that is configured to cover a front bumper of a vehicle and at least partially block a front view of front wheels of the vehicle. In this embodiments, the fascia may include fluid conduits each configured to provide a sightline to a respective front wheel. The fascia may also include redirection portals intersecting the fluid conduits, where each redirection portal may be configured to provide an air flow away from a respective front wheel. The fascia may also include adjustable panels each associated with a respective fluid conduit. Thus, as mentioned above, when the vehicle is travelling at a velocity below a predetermined lower level, each adjustable panel may be configured to substantially open the respective fluid conduit so as to provide the sightline to the respective front wheel, and, when the vehicle is travelling at a velocity above a predetermined upper level, each adjustable panel may be configured to substantially close the respective fluid conduit and redirect the air flow through a respective redirection portal away from the respective front wheel.

Furthermore, the present disclosure also defines a front bumper assembly. For example, the front bumper assembly may include a front bumper of a vehicle configured to provide protection in the event of a front end collision. The front bumper assembly may also include a decorative front fascia arranged over the front bumper, where the decorative front fascia may be configured to at least partially block a view of front wheels of the vehicle. The front bumper assembly may also include fluid conduits formed in the decorative front fascia, where each fluid conduit may be configured to provide a sightline to a respective front wheel. Also, the front bumper assembly may include redirection portals formed in the decorative front fascia, where each redirection portal may intersect a respective fluid conduit and may be configured to provide an air flow away from a respective front wheel. In addition, the front bumper assembly may include adjustable panels arranged in the fluid conduits, where each adjustable panel may be associated with a respective fluid conduit. Thus, when the vehicle is travelling at a velocity below a predetermined lower level, each adjustable panel may be configured to substantially open the respective fluid conduit so as to provide the sightline to the respective front wheel, and, when the vehicle is travelling at a velocity above a predetermined upper level, each adjustable panel may be configured to substantially close the respective fluid conduit and redirect the air flow through a respective redirection portal away from the respective front wheel.

In some embodiments, the vehicle, fascia, and/or front bumper assembly may further comprise a) air deflectors arranged in the fluid conduits of the decorative front fascia, and b) diverting elements. For example, the front wheels may be associated with front brake components and may further be associated with wheel wells that at least partially surround top portions of the front wheels and the front brake components. The air deflectors may be configured to deflect air flow to inward spaces of the wheel wells. The diverting elements may be configured to divert air flow toward the front brake components.

As described above, it may be noted that the hinges 68 may be arranged in a forward orientation with respect in the respective adjustable panels 52, as shown in FIG. 7. In this case, the stowed position 64 is on the opposite side of the wheel conduit 58 from the redirection portal 60. However, according to yet further implementations, an alternative hinge arrangement may include placing the hinge at a back end of the adjustable panels 52. In this case, this hinge may be attached to the fascia on the same side as the redirection portal 60 and may be configured to block the redirection portal 60 when the wheel conduit 58 is in the opened state. As such, the hinge may be formed with a spring having a spring force that may keep the adjustable panels 52 open under normal conditions, but then, when the force of air is applied to a "closing mechanism" of the adjustable panels 52, the force may cause the catch the wind and close the wheel conduit 58 and open up the redirection portal 60. Thus, this arrangement would not require stepper motor, but instead would be controlled by the force of the air flow and the strength of the spring action force. When sufficient air is applied to the adjustable panel 52, it will stay closed, but when the velocity of the vehicle drops below a certain level and the force of the air flow is less than the force of the spring action, the spring will cause the adjustable panel 52 to open the wheel conduit 58 and close the redirection portal 60.

Although the present disclosure is illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A front fascia assembly of a vehicle, comprising:
 a front bumper fascia defining a fluid conduit configured to direct a fluid flow through the front bumper fascia, wherein the fluid conduit comprises a front portion and a rear portion, the fluid flow including water;
 a redirection portal defined by the front bumper fascia and intersecting the fluid conduit between the front portion and the rear portion; and
 an adjustable panel disposed within the fluid conduit and configured to be disposed in a first configuration when a water flow above a predetermined threshold is sensed in the fluid conduit and a second configuration when a water flow below a predetermined threshold is sensed in the fluid conduit;
 wherein, when the adjustable panel is disposed in the first configuration, the fluid flow is directed from the front portion of the fluid conduit to the rear portion of the fluid conduit and toward a front wheel of the vehicle; and
 wherein, when the adjustable panel is disposed in the second configuration, the fluid flow is directed from the front portion of the fluid conduit to the redirection portal and away from the front wheel of the vehicle.

2. The front fascia assembly of claim 1, wherein the fluid flow comprises air, and wherein:
 the adjustable panel is configured to be disposed in the first configuration when the vehicle is travelling at a velocity below a predetermined threshold so as to direct the fluid flow toward the front wheel of the vehicle; and
 the adjustable panel is configured to be disposed in the second configuration when the vehicle is travelling at a velocity above a predetermined threshold so as to direct the fluid flow away from the front wheel of the vehicle.

3. The front fascia assembly of claim 1, wherein the adjustable panel is one of pivotably, translatably, and rotatably deployable within the fluid conduit between an open position and a closed position.

4. The front fascia assembly of claim 3, further comprising an actuator configured to move the adjustable panel between the open position and the closed position.

5. The front fascia assembly of claim 3, further comprising a locking mechanism configured to hold the adjustable panel in the open position and the closed position.

6. The front fascia assembly of claim 1, further comprising one or more of:
 a fluid deflector arranged in the rear portion of the fluid conduit configured to direct the fluid flow to an inward space of a wheel well of the vehicle; and
 a diverting element arranged in the wheel well of the vehicle configured to direct the fluid flow toward a front brake component of the vehicle.

7. A vehicle, comprising:
 a front bumper;
 a front wheel;
 a front fascia assembly configured to cover the front bumper and at least partially block the front wheel, the front fascia assembly comprising:
  a front bumper fascia defining a fluid conduit configured to direct a fluid flow through the front bumper fascia, wherein the fluid conduit comprises a front portion and a rear portion, the fluid flow including water;

a redirection portal defined by the front bumper fascia and intersecting the fluid conduit between the front portion and the rear portion; and an adjustable panel disposed within the fluid conduit and configured to be disposed in a first configuration when a water flow above a predetermined threshold is sensed in the fluid conduit and a second configuration when a water flow below a predetermined threshold is sensed in the fluid conduit;

wherein, when the adjustable panel is disposed in the first configuration, the fluid flow is directed from the front portion of the fluid conduit to the rear portion of the fluid conduit and toward the front wheel; and wherein, when the adjustable panel is disposed in the second configuration, the fluid flow is directed from the front portion of the fluid conduit to the redirection portal and away from the front wheel.

8. The vehicle of claim 7, wherein the fluid flow comprises air, and wherein:

the adjustable panel is configured to be disposed in the first configuration when the vehicle is travelling at a velocity below a predetermined threshold so as to direct the fluid flow toward the front wheel; and the adjustable panel is configured to be disposed in the second configuration when the vehicle is travelling at a velocity above a predetermined threshold so as to direct the fluid flow away from the front wheel.

9. The vehicle of claim 7, wherein the adjustable panel is one of pivotably, translatably, and rotatably deployable within the fluid conduit between an open position and a closed position.

10. The vehicle of claim 9, wherein the front fascia assembly further comprises an actuator configured to move the adjustable panel between the open position and the closed position.

11. The vehicle of claim 9, wherein the front fascia assembly further comprises a locking mechanism configured to hold the adjustable panel in the open position and the closed position.

12. The vehicle of claim 7, further comprising:

a wheel well;

a front brake component; and one or more of:

a fluid deflector arranged in the rear portion of the fluid conduit configured to direct the fluid flow to an inward space of the wheel well; and a diverting element arranged in the wheel well configured to direct the fluid flow toward the front brake component.

13. A front bumper assembly of a vehicle, comprising:

a front bumper; and a front fascia assembly configured to cover the front bumper and at least partially block a front wheel of the vehicle, the front fascia assembly comprising:

a front bumper fascia defining a fluid conduit configured to direct a fluid flow through the front bumper fascia, wherein the fluid conduit comprises a front portion and a rear portion, the fluid flow including water;

a redirection portal defined by the front bumper fascia and intersecting the fluid conduit between the front portion and the rear portion; and an adjustable panel disposed within the fluid conduit and configured to be disposed in a first configuration when a water flow above a predetermined threshold is sensed in the fluid conduit and a second configuration when a water flow below a predetermined threshold is sensed in the fluid conduit;

wherein, when the adjustable panel is disposed in the first configuration, the fluid flow is directed from the front portion of the fluid conduit to the rear portion of the fluid conduit and toward the front wheel of the vehicle; and wherein, when the adjustable panel is disposed in the second configuration, the fluid flow is directed from the front portion of the fluid conduit to the redirection portal and away from the front wheel of the vehicle.

14. The front bumper assembly of claim 13, wherein the fluid flow comprises air, and wherein:

the adjustable panel is configured to be disposed in the first configuration when the vehicle is travelling at a velocity below a predetermined threshold so as to direct the fluid flow toward the front wheel of the vehicle; and the adjustable panel is configured to be disposed in the second configuration when the vehicle is travelling at a velocity above a predetermined threshold so as to direct the fluid flow away from the front wheel of the vehicle.

15. The front bumper assembly of claim 13, wherein the adjustable panel is one of pivotably, translatably, and rotatably deployable within the fluid conduit between an open position and a closed position.

16. The front bumper assembly of claim 15, wherein the front fascia assembly further comprises an actuator configured to move the adjustable panel between the open position and the closed position.

17. The front bumper assembly of claim 15, wherein the front fascia assembly further comprises a locking mechanism configured to hold the adjustable panel in the open position and the closed position.

* * * * *